United States Patent
Dupuis et al.

(10) Patent No.: US 10,859,348 B1
(45) Date of Patent: Dec. 8, 2020

(54) SYSTEM FOR ACTIVE TELESCOPE ALIGNMENT, FOCUS AND BEAM CONTROL

(71) Applicant: NORTHROP GRUMMAN SYSTEMS CORPORATION, Falls Church, VA (US)

(72) Inventors: Michael L. Dupuis, Culver City, CA (US); Joshua E. Rothenberg, Los Angeles, CA (US); Philip H. Maki, Redondo Beach, CA (US); Gregory E. Foo, Long Beach, CA (US); Christopher J. Lieto, Agoura Hills, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 339 days.

(21) Appl. No.: 16/025,417

(22) Filed: Jul. 2, 2018

(51) Int. Cl.
| | |
|---|---|
| *F41H 13/00* | (2006.01) |
| *G02B 23/06* | (2006.01) |
| *G02B 27/40* | (2006.01) |
| *H01S 3/067* | (2006.01) |
| *H01S 3/00* | (2006.01) |
| *G02B 26/08* | (2006.01) |

(52) U.S. Cl.
CPC .......... *F41H 13/005* (2013.01); *G02B 23/06* (2013.01); *G02B 26/0816* (2013.01); *G02B 27/40* (2013.01); *H01S 3/0071* (2013.01); *H01S 3/06754* (2013.01)

(58) Field of Classification Search
None
See application file for complete search history.

(56) References Cited

U.S. PATENT DOCUMENTS

| | | |
|---|---|---|
| 5,923,418 A | 7/1999 | Clark et al. |
| 6,288,381 B1 | 9/2001 | Messina |
| 8,203,109 B2 | 6/2012 | Taylor et al. |
| 8,748,857 B2 | 6/2014 | King et al. |
| 9,632,282 B2 | 4/2017 | Van Lue et al. |
| 2004/0150881 A1 | 8/2004 | Luthardt et al. |
| 2010/0282942 A1* | 11/2010 | Mosier .................. F41H 13/005 250/203.2 |
| 2016/0306149 A1* | 10/2016 | Eisenberg .............. H04N 5/332 |
| 2017/0090178 A1 | 3/2017 | Bullard et al. |

* cited by examiner

*Primary Examiner* — Jennifer D. Carruth
(74) *Attorney, Agent, or Firm* — Shumaker, Loop & Kendrick, LLP; John A. Miller

(57) ABSTRACT

A beam directing telescope for use in a directed energy weapons system that employs active telescope component alignment and that includes a primary mirror and a secondary mirror. The secondary mirror includes a first surface having a dichroic coating that reflects and directs a high energy laser beam to the primary mirror, reflects a portion of the reference beams and passes a portion of the reference beams that are focused by a second surface of the secondary mirror. A position sensing detector (PSD) is positioned relative to the secondary mirror such that the reference beams are focused as a spot on the PSD, where the PSD senses a position of the reference beams. An actuator changes the orientation of the secondary mirror to an alignment position if the position of the focused spots on the PSD is not the position for a desired alignment of the mirrors.

20 Claims, 2 Drawing Sheets

SYSTEM FOR ACTIVE TELESCOPE ALIGNMENT, FOCUS AND BEAM CONTROL

BACKGROUND

Field

This disclosure relates generally to a beam directing telescope and, more particularly, to a beam directing telescope that is applicable to be used in a directed energy laser weapons system and that provides active telescope component alignment.

Discussion of the Related Art

Fiber laser amplifier systems that employ spectral beam combining (SBC) and coherent beam combining (CBC) architectures are often useful for directed energy (DE) laser weapons systems because of their high efficiency, high power scalability and excellent beam quality. In addition, the guided wave nature of light propagation in fiber enables packaging of beam combined fiber sources on fielded platforms. These types of weapons systems often employ beam director systems that reflect, expand, and point a high energy laser (HEL) beam to an intended target, where the director system includes a gimbaled telescope that points and directs the laser output beam to the target, and provides downstream imaging.

Beam director telescopes for directed energy weapons systems are often extremely sensitive to component misalignment. For example, micron-scale misalignment of telescope components may result in an unacceptable degradation of beam quality, and thus an unacceptable performance of the laser system. Directed energy laser weapons systems are often subjected to high stress environments, such as by being on an aircraft, and thus vibration profiles experienced by beam director systems result in disturbances that far exceed these micron-scale misalignment thresholds. Off-axis telescopes, which offer significant performance and packaging improvements compared to on-axis systems, are much more sensitive to telescope misalignment. Therefore, directed energy weapons systems often must trade misalignment sensitivity with system performance, where telescope misalignment sensitivity can be a limiting factor for performance. As such, telescope alignment sensitivity is considered a critical technical issue across all directed energy weapons systems.

In addition, directed energy weapons systems try to obtain the most irradience (power per unit area) for various target ranges. It is extremely desirable to focus the output laser beam, which increases irradiance on target and thus system performance. However, beam director telescopes without focus control have a fixed focal length, resulting in an optimized spot size for (at most) a singular target range.

Various techniques are known in the art for reducing and controlling misalignment sensitivity in a telescope of the type referred to above, and can generally be classified into two categories, namely, passive and active misalignment control techniques. Known passive misalignment control techniques attempt to reduce telescope misalignment without using actuated components, and often include rigid opto-mechanical metering structures, rigid optical substrate material selection, and sensitivity optimized optical designs. However, these passive approaches only improve system sensitivity, rather than dynamically responding and correcting for telescope misalignment. The sensitivity reduction provided by passive techniques lacks the micron-scale correction and control required for the most demanding telescope systems.

Known active misalignment control techniques attempt to control alignment and beam stabilization through the use of actuated optical components to return the telescope back to a reference state. These techniques inject reference beams that propagate through the optical system along a common path with the laser beam of interest and onto a position sensing detector (PSD). Disturbances sensed by the detector reflect changes in beam tilt and walk of the laser beam. However, the disturbances sensed by the PSD are inclusive of only beam tilt and walk, and are not directly indicative of component misalignment. Along a beam path with multiple optical components, the reference beams pick up disturbances caused by each individual optical component, and the final disturbance sensed on the PSD is the aggregate disturbance caused by the entire optical train. However, these active techniques cannot isolate misalignment contributions from individual elements or components in the telescope.

SUMMARY

The following discussion discloses and describes a beam directing telescope for use in a directed energy weapons system that employs active telescope component alignment. The directed energy system includes a laser source that generates a high energy laser (HEL) beam at a given wavelength. The telescope receives the HEL beam and includes a plurality of reference beam sources each generating a reference beam at wavelengths that are different than the HEL beam wavelength. The telescope also includes a primary mirror and a secondary mirror that receive, reflect and focus the high energy laser beam and the reference beams. The secondary mirror includes a first surface having a dichroic coating that reflects and directs the high energy laser beam to the primary mirror, reflects a portion of the reference beams received from the primary mirror and passes a portion of the reference beams received from the primary mirror that are focused by a second surface of the secondary mirror. The second surface of the secondary mirror is optimized to focus the reference beams onto a position sensing detector (PSD). The PSD is positioned relative to the secondary mirror opposite to the primary mirror such that the portion of the reference beams focused by the second surface of the secondary mirror are focused as a spot on the PSD, where the PSD senses a position of the reference beams and provides position signals identifying the position of the reference beams on the PSD. The locations of the reference beams on the PSD are calibrated in an aligned state, and the PSD reports differences in relative spot location during operation. An actuator is responsive to the position signals and provides a control signal to change the orientation of the secondary mirror to correct the position of the focused spots on the PSD if the primary mirror or the secondary mirror is misaligned.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a beam directing telescope for use in a directed energy laser weapons system that employs active telescope component alignment is merely exemplary in nature, and is in no way intended to limit the invention or its applications or uses.

This disclosure describes a beam directing telescope that includes an alignment architecture for providing real-time sensing and correction of telescope component misalignment, independent from beam misalignment, where the telescope has particular application for use in a directed energy laser weapons system. The alignment architecture combines the coarse sensitivity reduction provided by passive alignment techniques and the fine sensitivity reduction provided by active alignment control. The active correction dynamically responds to the vibration profiles experienced by the telescope and corrects jitter-induced and low frequency sources of telescope misalignment. Active correction of telescope misalignment enables telescope designs that were previously unobtainable. The alignment architecture also provides the ability to adjust telescope focus and interfaces with traditional beam control architectures. Thus, in addition to telescope alignment control, the actuated components proposed in the telescope allow for the adjustment of system focal length, and thus maximization of performance across varied target ranges. Traditional directed energy systems utilize beam tilt and walk control schemes that rely on reference sources and position sensors. The alignment architecture proposed herein seeks to utilize a common reference source for both telescope alignment and beam walk and tilt control.

Figure 1:
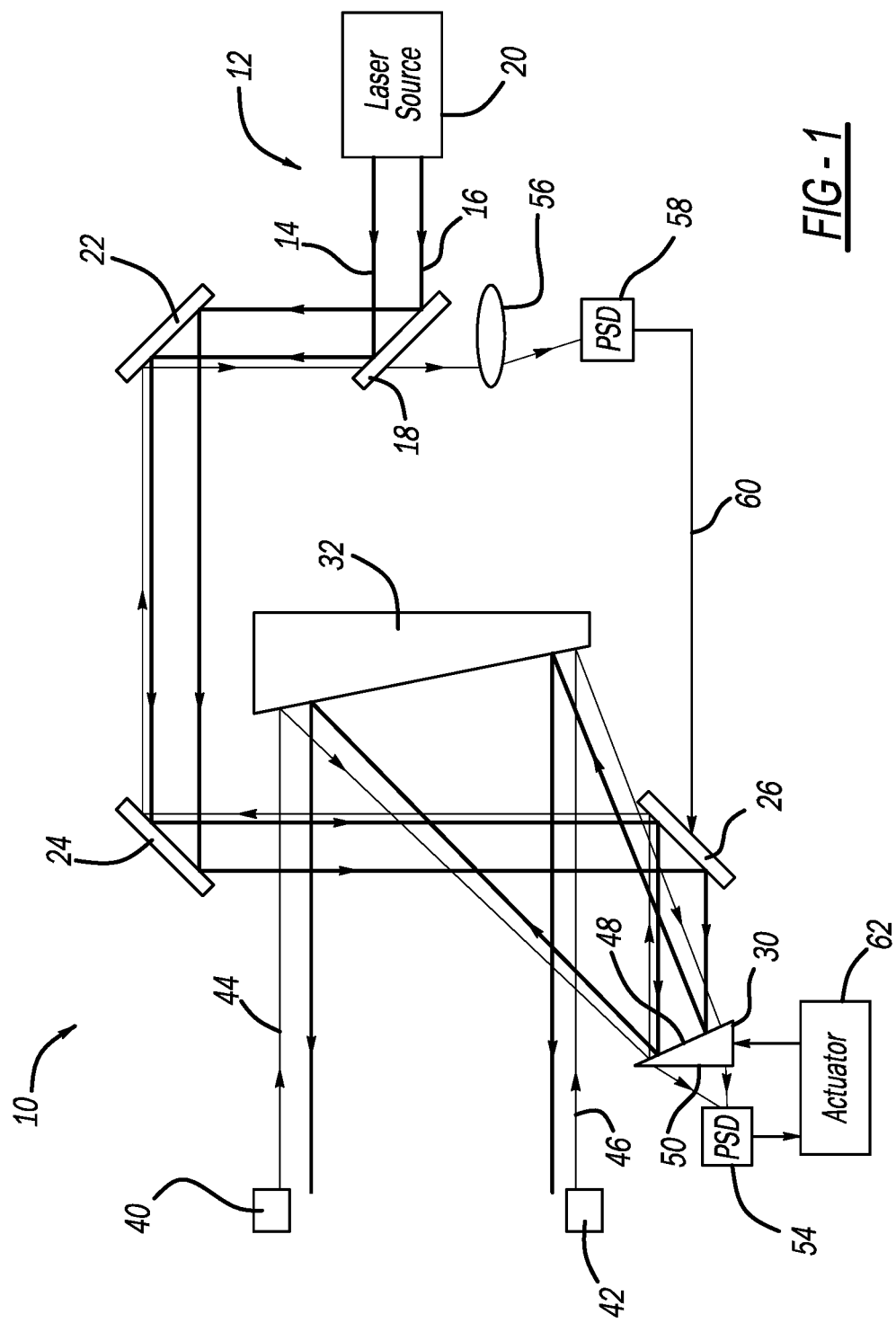
FIG. 1 is a general block diagram of an off-axis beam directing telescope for a directed energy laser weapons system.

FIG. 1 is a general block diagram of an off-axis beam directing telescope 10 that directs a collimated input high energy laser (HEL) beam 12, defined by beam rays 14 and 16, from, for example, a laser source 20 of the type that can be used in a directed energy laser weapons system, such as a CBC or SBC fiber laser amplifier. The telescope components discussed below can be mounted within a rigid opto-mechanical metering structure or tube (not shown). The HEL beam 12 is sent to a beam splitter 18 that is coated to highly reflect at the wavelength of the beam 12, where the beam 12 is reflected therefrom towards and off of a series of folding optics 22 and 24, and onto a fast steering mirror (FSM) 26. The HEL beam 12 is reflected off of the FSM 26 and onto a parobolic secondary mirror 30, where it is reflected therefrom onto a parabolic primary mirror 32, and is reflected from the mirror 32 as an output HEL beam that is focused by a telescope focus drive (not shown) to propagate towards a target of interest.

In order to align the components of the telescope 10 in the manner discussed herein, a pair of reference laser sources 40 and 42 emit collimated references beams 44 and 46, respectively, parallel to the optical axis of the telescope 10 in a propagation direction opposite to the propagation direction of the HEL beam 12. In alternate embodiments, additional reference beams can be employed, where the ideal number of reference beams may be three reference beams. In one embodiment, the reference sources 40 and 42 are monochromatic pulsed lasers having an emission wavelength distinct from the emission wavelength of the beam 12. The reference beams 44 and 46 are directed onto the primary mirror 32 and are reflected therefrom towards the secondary mirror 30, where the reference sources 44 and 46 are positioned at a location between the HEL beam 12 and the outer diameter of the primary mirror 32. The secondary mirror 30 has a parabolic front surface coated with a thin-film dichroic coating 48 that permits both the transmission and reflection of the reference beams 44 and 46, but completely reflects the HEL beam 12. A back surface 50 of the secondary mirror 30 is optimized to focus the transmitted portion of the reference beams 44 and 46 onto a PSD 54 located behind the secondary mirror 30 in a common opto-mechanical assembly. In this configuration, the focal length of the primary mirror 32 is selected to be long enough so that there is significant beam tilt sensitivity to better detect component misalignment.

One of the reference beams 44 or 46, here beam 44, is used to provide a line-of-sight reference for the telescope 10. Particularly, a reflected portion of the reference beam 44 from the secondary mirror 30 is directed towards and reflected off of the FSM 26 and the folding optics 24 and 22, travels through the beam splitter 18 that is coated to transmit the wavelength of the reference beam 44, and is focussed by a lens 56 onto a PSD 58. The focussed spot of the beam 44 on the PSD 58 allows the PSD 58 to sense reference beam tilt, i.e., line-of-sight errors, through positional changes of the focussed spot of the beam 44 on the PSD 58. The PSD 58 outputs a voltage signal on a control line 60 that corresponds to the location of the focussed spot on the PSD 58, which is used to control the tilt orientation of the FSM 26 to null the voltage signal to the desired line-of-sight value.

If the primary and secondary mirrors 32 and 30 are properly aligned, then the focal spot of the reference beams 44 and 46 on the PSD 54 will be at the same location, excluding extremely small position shift due to aberration, and if the primary and secondary mirrors 32 and 30 are not properly aligned, then the reference beams 44 and 46 are focussed at different locations on the PSD 54 and have a relative positional difference. The aligned location of the beams 44 and 46 on the PSD 54 varies as a function of telescope focus. The reference sources 40 and 42 are pulsed to time-phase the beams 44 and 46 so that the PSD 54 knows which of the beams 44 or 46 is being received at a particular time. The PSD 54 records the location of the reference beams 44 and 46 when the telescope 10 is in an aligned state, where any misalignment of the telescope 10, i.e., primary/secondary mirror tilt, decenter, etc., results in deviation of the focused spot of the beams 44 and 46 on the PSD 54. The spot location identified by the PSD 54 measures induced beam tilt/walk from the optical components that share the same path as the HEL beam 12 and the reference beams 44 and 46 through the telescope 10.

If misalignment of the telescope components is detected by the PSD 54, the secondary mirror 30 is actuated so as to return the focused spot of the beams 44 and 46 to their aligned locations on the PSD 54. More particularly, if the mirrors 30 and 32 become misaligned, the PSD 54 identifies this occurrence in the manner discussed above, and sends a control signal to an actuator 62 that controls the orientation of the secondary mirror 30 in one or all of the X and Y directions, rotation about the X and Y axes, and a focus adjustment towards and away from the primary mirror 32 along the apparent axis of the telescope 10. Particularly, to focus the telescope 10, the secondary mirror 30 is actuated along the chief-ray of the HEL beam 12, which changes the primary-secondary mirror separation along the chief-ray to adjust the focal length of the telescope 10.

Figure 2:
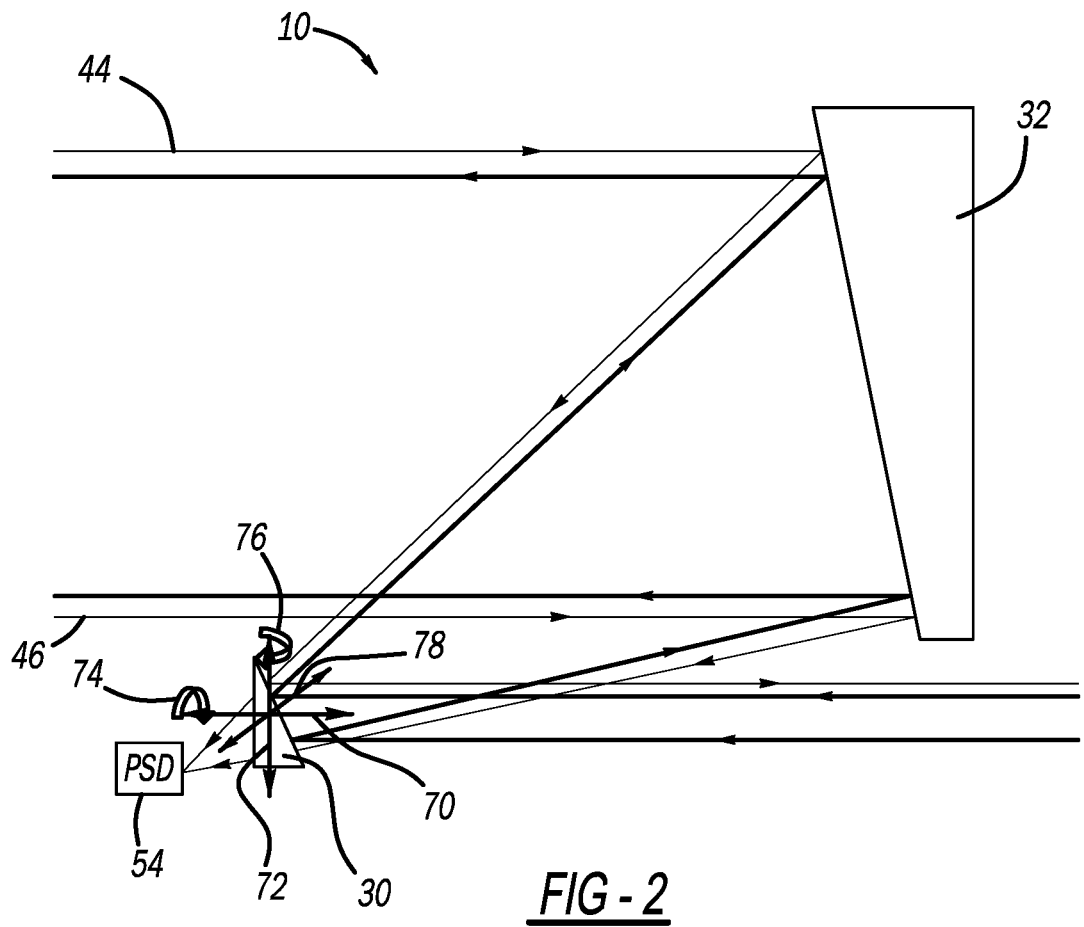
FIG. 2 is an illustration of a portion of the telescope shown in FIG. 2 depicting directional control of the secondary mirror.

FIG. 2 is an illustration of a portion of the telescope 10 showing the primary mirror 32 and the secondary mirror 30 that illustrates the control direction of the secondary mirror 30 as discussed above. Particularly, arrow 70 shows translation of the mirror 30 about the X-axis, arrow 72 shows translation of the mirror 30 about the Y-axis, arrow 74 shows rotation of the mirror 30 about the X-axis, and arrow 76 shows rotation of the mirror 30 about the Y-axis. Translation about the X and Y-axes not only provides component alignment as discussed, but also provides a focus adjustment of the telescope 10 for changing distances to the target along the chief-ray of the HEL beam 12, where arrow 78 shows translation of the mirror 30 in a focus direction.

Figure 3:
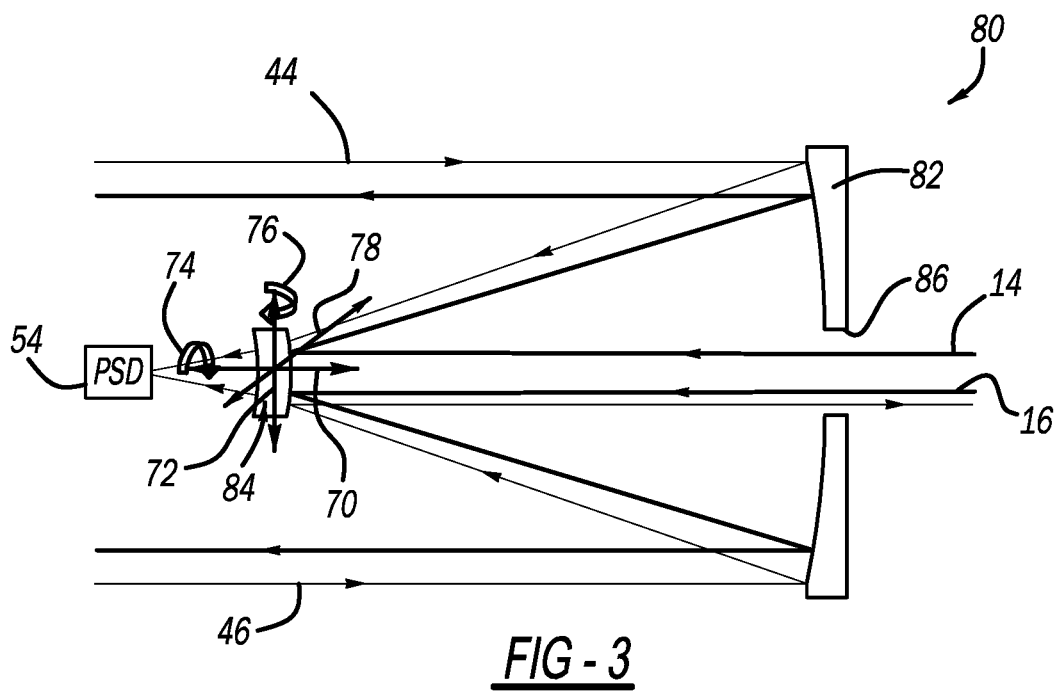
FIG. 3 is an illustration of an on-axis beam directing telescope.

The telescope 10 is an off-axis telescope. However, the same telescope misalignment determination scheme discussed above can be employed in an on-axis telescope. FIG. 3 is an illustration of a portion of an on-axis telescope 80 showing this embodiment, where like elements to the telescope 10 are identified by the same reference number. The primary mirror 32 is replaced with a parent parabolic primary mirror 82 and the secondary mirror 30 is replaced with a parent parabolic secondary mirror 84 having a different shape than the mirror 30, where the mirror 82 has a central opening or aperture 86. The secondary mirror 84 and the PSD 54 are positioned in alignment with the aperture 86 so that the secondary mirror 84 receives the HEL beam 12 from the aperture 86 and directs the focussed HEL beam 12 through the aperture 86 and receives the references beams 44 and 46 from the primary mirror 82, as shown. The alignment between the primary mirror 82 and the secondary mirror 84 is determined by the focal spot of the reference beams 44 and 46 on the PSD 54, and the secondary mirror 30 is actuated to correct the beam focus on the PSD 54 if misalignment occurs in the same manner discussed above.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A telescope for directing a laser beam to a target, said telescope comprising:
    a laser beam source generating a high energy laser beam at a certain wavelength;
    a plurality of reference beam sources each generating a reference beam at certain wavelengths that are different than the wavelength of the high energy beam;
    a primary mirror receiving, reflecting and focusing the high energy laser beam and the reference beams;
    a secondary mirror receiving, reflecting and focusing the high energy laser beam and the reference beams, said secondary mirror including a first surface having a dichroic coating that reflects and directs the high energy laser beam to the primary mirror, reflects a portion of the reference beams received from the primary mirror and passes a portion of the reference beams received from the primary mirror that are focused by a second surface of the secondary mirror;
    a first position sensing detector (PSD) positioned relative to the secondary mirror opposite to the primary mirror such that the portion of the reference beams focused by the second surface of the secondary mirror are focused as a spot on the first PSD, said first PSD sensing a position of the reference beams and providing position signals identifying the position of the reference beams on the first PSD; and
    an actuator configured to change the orientation of the secondary mirror relative to the primary mirror, said actuator being responsive to the position signals and providing a control signal to change the orientation of the secondary mirror to an alignment position if the position of the focused spots on the first PSD are not the positions for a desired alignment between the primary mirror and the secondary mirror.

2. The telescope according to claim 1 wherein the telescope is an off-axis telescope where the primary mirror and the secondary mirror are not on the same axis.

3. The telescope according to claim 1 wherein the telescope is an on-axis telescope where the primary mirror and the secondary mirror are on the same axis.

4. The telescope according to claim 1 wherein the plurality of reference beam sources are pulsed laser sources and wherein the reference beam sources are controlled so that only one of the reference beams impinges the first PSD at any particular point in time.

5. The telescope according to claim 1 wherein the plurality of reference beam sources is two or three reference beam sources.

6. The telescope according to claim 1 wherein the primary and secondary mirrors are parabolic mirrors.

7. The telescope according to claim 1 wherein the actuator moves the secondary mirror to change the focal length of the telescope.

8. The telescope according to claim 1 wherein the actuator moves the secondary mirror in translation and rotation for both an X and Y axis.

9. The telescope according to claim 1 further comprising a fast steering mirror (FSM), a second PSD and a lens, said FSM receiving and reflecting at least one of the reference beams from the secondary mirror and said lens focusing the at least one reference beam onto the second PSD, said second PSD identifying a position of the focused reference beam on the second PSD and controlling the orientation of the FSM based on the position of the beam to correct for beam tilt and beam walk.

10. The telescope according to claim 1 wherein the laser beam and the reference beams propagate in opposite directions through the telescope.

11. The telescope according to claim 1 wherein the laser beam source is a fiber laser amplifier.

12. The telescope according to claim 1 wherein the telescope is part of a directed energy laser weapons system.

13. A telescope for directing a laser beam to a target, said telescope comprising:
    a plurality of reference beam sources each generating a reference beam at a certain wavelength;
    a primary mirror receiving, reflecting and focusing the reference beams;
    a secondary mirror including a first surface having a dichroic coating that reflects a portion of the reference beams received from the primary mirror and passes a portion of the reference beams received from the primary mirror that are focused by a second surface of the secondary mirror; and
    a position sensing detector (PSD) positioned relative to the secondary mirror opposite to the primary mirror such that the portion of the reference beams focused by the second surface of the secondary mirror are focused as a spot on the first PSD, said first PSD sensing a position of the reference beams and providing position signals identifying the position of the reference beams on the first PSD, wherein the position signals are used to change the orientation of the secondary mirror to an alignment position if the position of the focused spots on the first PSD are not the positions for a desired alignment between the primary mirror and the secondary mirror.

14. The telescope according to claim 13 wherein the telescope is an off-axis telescope where the primary mirror and the secondary mirror are not on the same axis.

15. The telescope according to claim 13 wherein the telescope is an on-axis telescope where the primary mirror and the secondary mirror are on the same axis.

16. The telescope according to claim 13 wherein the plurality of reference beam sources are pulsed laser sources and wherein the reference beam sources are controlled so that only one of the reference beams impinges the PSD at any particular point in time.

17. The telescope according to claim 13 wherein the plurality of reference beam sources is two or three reference beam sources.

18. The telescope according to claim 13 wherein the primary and secondary mirrors are parabolic mirrors.

19. An off-axis telescope for directing a laser beam to a target, said telescope being part of a directed energy laser weapons system, said telescope comprising:
  a laser beam source generating a high energy laser beam at a certain wavelength;
  a plurality of reference beam sources each generating a reference beam at certain wavelengths that are different than the wavelength of the high energy beam;
  a primary mirror receiving, reflecting and focusing the high energy laser beam and the reference beams;
  a secondary mirror receiving, reflecting and focusing the high energy laser beam and the reference beams, said secondary mirror including a first surface having a dichroic coating that reflects and directs the high energy laser beam to the primary mirror, reflects a portion of the reference beams received from the primary mirror and passes a portion of the reference beams received from the primary mirror that are focused by a second surface of the secondary mirror;
  a first position sensing detector (PSD) positioned relative to the secondary mirror opposite to the primary mirror such that the portion of the reference beams focused by the second surface of the secondary mirror are focused as a spot on the first PSD, said first PSD sensing a position of the reference beams and providing position signals identifying the position of the reference beams on the first PSD, wherein the plurality of reference beam sources are pulsed laser sources and wherein the reference beam sources are controlled so that only one of the reference beams impinges the first PSD at any particular point in time;
  an actuator configured to change the orientation of the secondary mirror relative to the primary mirror, said actuator being responsive to the position signals and providing a control signal to change the orientation of the secondary mirror to an alignment position if the position of the focused spots on the first PSD are not the positions for a desired alignment between the primary mirror and the secondary mirror; and
  a fast steering mirror (FSM), a second PSD and a lens, said FSM receiving and reflecting at least one of the reference beams from the secondary mirror and said lens focusing the at least one reference beam onto the second PSD, said second PSD identifying a position of the focused reference beam on the second PSD and controlling the orientation of the FSM based on the position of the beam to correct for beam tilt and beam walk.

20. The telescope according to claim 19 wherein the actuator moves the secondary mirror to change the focal length of the telescope and moves the secondary mirror in translation and rotation for both an X and Y axis.

* * * * *